United States Patent [19]

Cacciola et al.

[11] 4,030,578

[45] June 21, 1977

[54] TORQUE LIMITER

[75] Inventors: Michael John Cacciola, Puyallup; Leonard Olaf Mjolsnes, Mercer Island, both of Wash.

[73] Assignee: The Boeing Company, Seattle, Wash.

[22] Filed: May 3, 1976

[21] Appl. No.: 682,829

[52] U.S. Cl. .......................................... 188/134
[51] Int. Cl.² ........................................ B60T 7/12
[58] Field of Search ................... 188/134; 192/8 R

[56] References Cited
UNITED STATES PATENTS 3,596,740  8/1971  Nau .................................... 188/134

Primary Examiner—Duane A. Reger
Attorney, Agent, or Firm—Frederick J. McKinnon, Jr.; Bernard A. Donahue

[57] ABSTRACT

A torque limiting device for preventing the transmission of torque from a drive source to a torque responsive element when a predetermined torque limit has been reached. The device operates by transmitting torque between two axial members having a plurality of balls therebetween with the balls engaged within precisely shaped sockets contained within each axial member. As excess torque occurs, the plurality of balls cause one member to axially displace with respect to the other member and engage a plurality of discs which lock both members, thereby preventing torque transmission.

5 Claims, 6 Drawing Figures

TORQUE LIMITER

FIELD OF THE INVENTION

The present invention pertains to torque limiting devices, and more particularly to cam members connected together through torque transmitting balls which are engaged in detent sockets.

DISCUSSION OF THE PRIOR ART

The present invention is well adapted for use in aircraft flight controls, such as trailing edge flap systems where a plurality of torque responsive elements are driven from a single drive source; however, the invention can be practiced in any system where the drive unit must be protected from exerting excessive torque.

A typical form of prior art wing flap torque lockout system is shown in U.S. Pat. No. 3,542,162 to R. H. Kerr. In that patent, the torque limiting device locks up to prevent the transmission of excess torque with the use of a ball ramp machined in a radial direction into one plate member. When excess torque occurs, braking shoes are extended radially to engage the housing, thereby preventing the transmission of torque.

SUMMARY OF THE IVNENTION

In the disclosed preferred embodiment of this invention, the torque limiting device operates by transmitting torque between two axial members having a plurality of balls therebetween with the balls engaged within precisely shaped sockets contained within each axial member. As excess torque occurs, the plurality of balls cause one member to axially displace with respect to the other member and engage a plurality of discs which lock both members thereby preventing torque transmission.

DESCRIPTION OF THE PREFERRED EMBODIMENT

Figure 1:
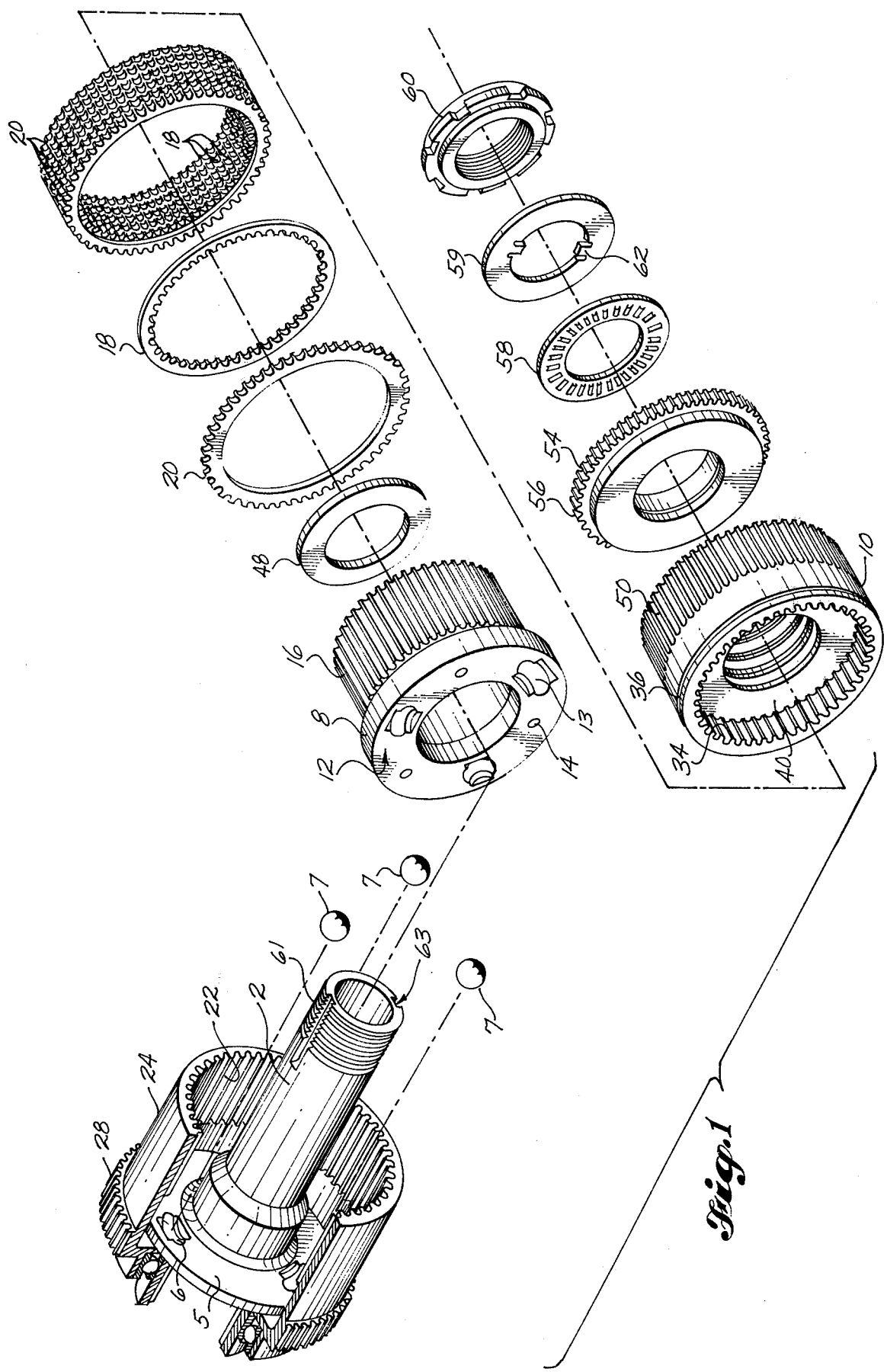
FIG. 1 is an expanded perspective view of a preferred embodiment of the invention.
Figure 2:
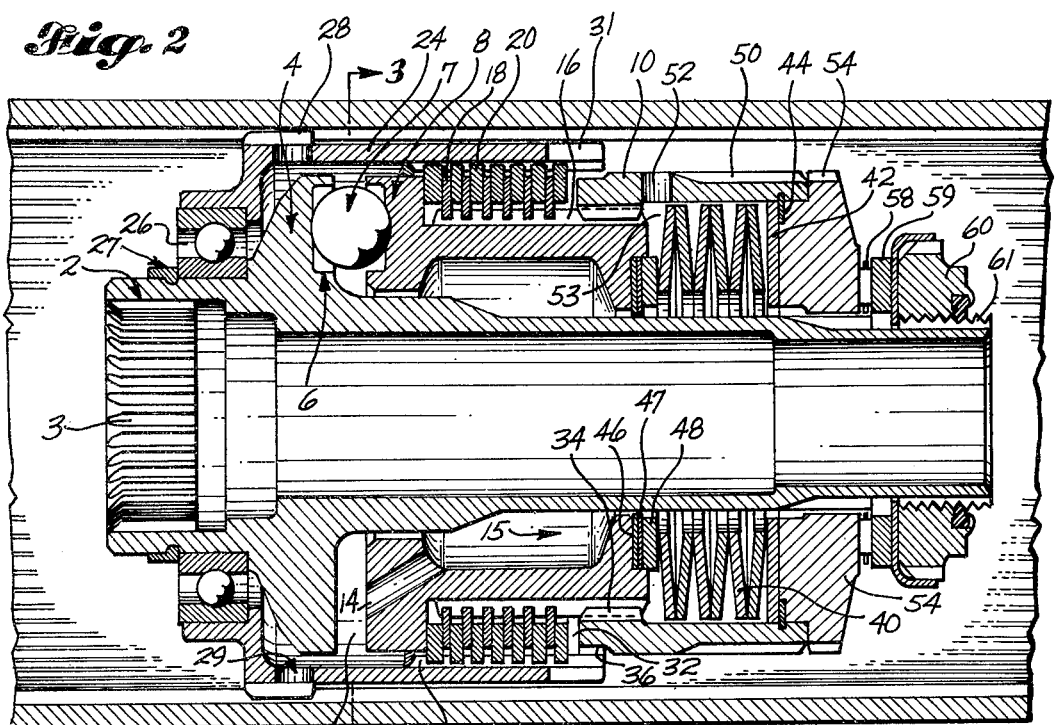
FIG. 2 is a cross sectional view of the preferred embodiment of FIG. 1.
Figure 3:
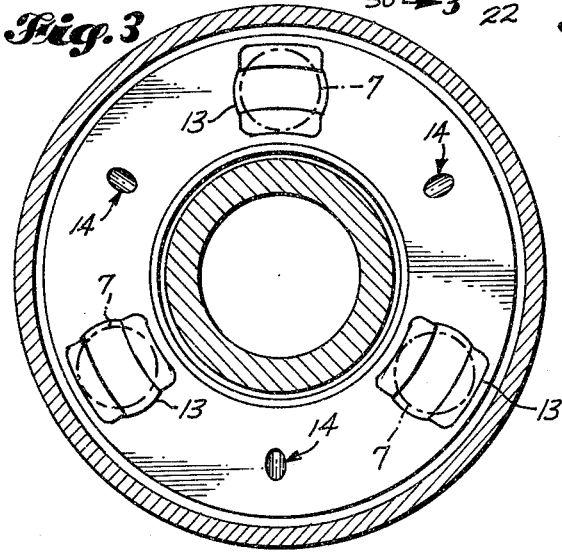
FIG. 3 is a cross sectional view taken along line 3—3 in FIG. 2 showing the detent socket detail in the output cam.
Figure 4:
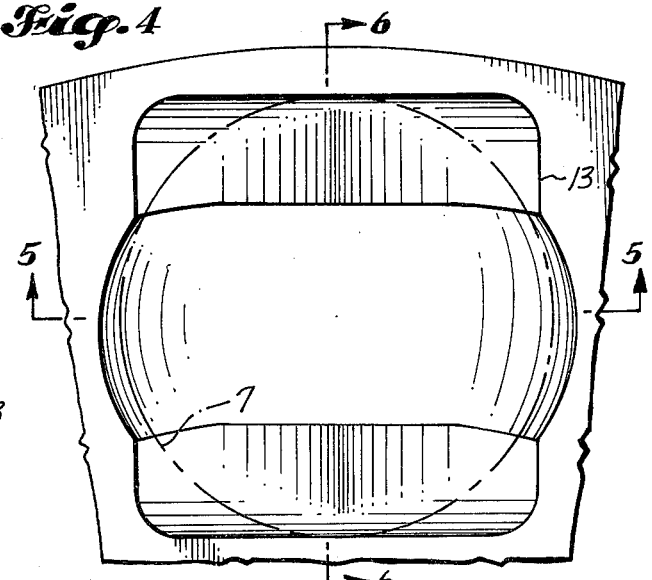
FIG. 4 is an enlargement of a typical detent socket showing a typical ball therein.

Referring to FIG. 1, a cylindrical shaped input cam 2 extends the entire length of the torque limiter. Into one end of the input cam, the drive end, is machined spline 3 which is used to facilitate connection of input cam 2 to a drive source. The shape of input cam 2 is such that a flange 4 extends outwardly in a direction substantially transverse to the axis of input cam 2. Flange 4 includes an input cam plate 5 into which a plurality of ball detent sockets 6 are placed at equal spaced intervals around its circumference. The ball detent sockets 6 accomodate a plurality of balls 7 used to couple the torque from the drive source through input cam 2 to the output cam 8 and spring cage 10 as will be more apparent in the description which follows.

Output cam 8, also cylindrical in shape, slidably mounts coaxially over a portion of input cam 2. The output cam includes an output cam plate 12 which contains a plurality of ball detent sockets 13 located at equal spaced intervals around its circumference. These ball detent sockets have identical shapes, both in the axial and radial direction, as do the plurality of sockets 6 in input cam plate 5. When output cam 8 is mounted over input cam 2, the input and output cam plates 5 and 12 engage the plurality of balls 7. Since the contour of the ball detent sockets are the same in both the input and output cam plates, the lockout torque is equivalent whether the drive source is rotating in the clockwise or counterclockwise direction.

Figure 5:
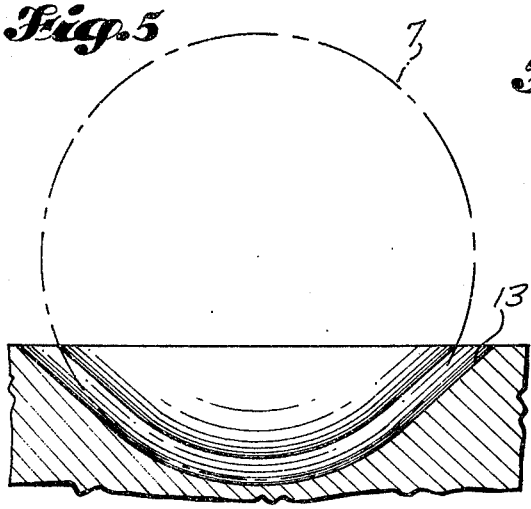
FIG. 5 is an axial cross sectional view taken along line 5—5 in FIG. 4.
Figure 6:
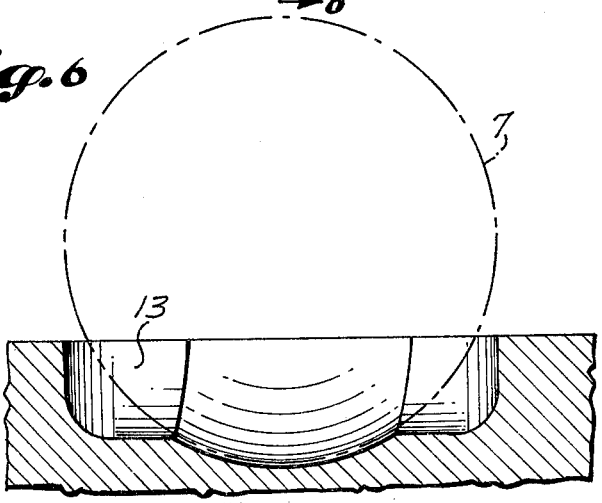
FIG. 6 is a radial cross sectional view taken along line 6—6 in FIG. 5.

The plurality of ball detent sockets 6 and 13 are shaped such that the plurality of balls 7 rotate in an arc or cirumferential direction in cam plates 5 and 12 as relative motion occurs between input cam 2 and the output cam 8. In this direction, as shown in FIG. 5, the "vee" shape of detent sockets 6 and 13 have a radius smaller than the balls to prevent movement of the input and output cams until the transmitted torque approaches the torque lockout setting. In the radial direction, as shown in FIG. 6, the shape of ball detent sockets 6 and 13 is such that radius of the "vee" shape is larger than the radius of balls 7. In this manner, the plurality of balls 7 will seek a position within detent sockets 6 and 13 such that each ball equally shares the load between input and output cams. In addition, the shape in this direction is desired to compensate for tolerance errors which occur in the machining and location of the individual socket detents.

A plurality of holes 14 extend from output cam plate 12 through to void 15 created when the output cam is mounted over the input cam. These holes are utilized to prevent the occurrence of condensation which may form due to the environment, and to drain off condensation.

A spline 16 is formed on the top surface of output cam 8 extending around its circumference, and engages a plurality of brake plates 18, as well as a spring cage 10, all of which slidably mount on spline 16. A plurality of reaction plates 20 are interleaved between brake plates 18 which engage a spline 22 located in the stator 24. The plurality of reaction plates 20 slidably mount over the output cam spline 16 and do not engage said spline. The plurality of brake and reaction plates abut the rear surface of output cam plate 12.

A cylindrical shaped stator 24 slidably mounts coaxially over a portion of the input cam and encloses the plurality of balls 7, output cam 8, and the plurality of brake and reaction plates 18 and 20. The stator 24 abuts flange 4 on input cam 2 and is rotatably mounted to input cam 2 by the ball bearing 26. Such mounting technique is well known in the prior art and will not be discussed further. A ball bearing 26 is secured to input cam 2 by a bearing retainer 27.

Stator 24 includes a spline 28 to connect the stator to any external rigid structure to stall the input drive source when the lockout torque has been exceeded. An internal spline 22 on the inside surface of stator 24 is used to engage the reaction plates 20 which are slidably mounted over spline 16.

A plurality of holes 29 extend from the top surface of stator 24 through to a void 30 created when the stator encompasses the output cam. Holes 29 help to prevent the accumulation of condensation.

Additionally, a hole 31 has been provided to verify the adjustment clearance 32 which exists between the plurality of break and reaction plates 18 and 20 and spring cage 10. Said clearance is used to adjust the lockout torque setting as will be discussed.

Spring cage 10, also cylindrical in shape, coaxially encompasses a portion of input cam 2. Spring cage 10 contains a spline 34 extending along a portion of its inside surface. Spline 34 engages spline 16 of output cam 8 when the spring cage encompasses input cam 2. It should be noted that a narrow notch 36 has been provided in spring cage 10 to allow sufficient clearance between the spline 22 in the stator and the outside surface of the spring cage. This facilitates alignment of spline 34 with spline 16. Contained within spring cage 10 are a plurality of belleville springs 40 which are circular in shape and slidably engage input cam 2. The belleville springs 40 are retained within the spring cage 10 by a wear plate 42 and a snap ring 44 and by spline 34. When the spring cage engages spline 16 in output cam 8, the springs 40 are compressed against wear plate 42 by a spacer 46, a spacer 48, and a shim 47. By varying the shim thickness. The spring compression can be changed a proportional amount to allow for a multiplicity of torque lockout settings, as will be described.

Spring cage 10 contains a spline 50 extending along a portion of its top surface. Spline 50 engages any output coupling which is used to transmit the drive torque.

Spring cage 10 contains a plurality of holes 52 extending from its top surface through to a void 53 containing the belleville springs 40. Holes 52 permit the drain off of any moisture which may accumulate, as has been previously discussed.

A spring plate 54 slidably engages input cam 2 and abuts both the spring cage 10 and wear plate 48. Spring plate 54 contains a spline 56 across its top surface which complements spline 50 in spring cage 10 and cooperates with this spline in the transmission of the input torque to the output coupling.

A needle bearing 58 and a washer 59 both slidably contact the input cam. Needle bearing 58 abuts spring plate 54 and washer 59, and allows for slight motion between spring plate 54 and the washer 59. Washer 59 abuts the adjustment nut 60 which engages the input cam through a plurality of threads 61 contained on said input cam. Washer 59 contains a plurality of keyed teeth 62 which are adapted to slidably fit within a plurality of corresponding grooves 63 located within input cam 2.

OPERATION OF THE TORQUE LIMITER

The operation of the above described torque limiter is as follows. When the lockout torque is below that which the torque limiter is adjusted to protect, the input drive torque applied to input cam 2 is coupled through the plurality of balls 7 to output cam 8. From there, this torque is transferrred through the mutually complementary splines 16 and 34 in output cam 8 and spring cage 10 to any output coupling by spline 50 located on the top surface of spring cage 10. The plurality of springs 40 maintain balls 7 in the detent sockets 6 and 13. As the lockout torque limit is approached, the plurality of balls begin to climb the ball detent sockets which in turn further separate input cam 2 and output cam 8. When this movement occurs, the plurality of brake plates 18 and reaction plates 20 are displaced axially into the adjustment clearance void 32. When lockout torque is exceeded, this void is eliminated and the resulting friction between adjacent brake plates and reaction plates causes the output cam to lock to stator 24 by spline 22 contained on the stator and spline 16 contained on the output cam. Input torque is then coupled from the input cam, through the plurality of balls to the output cam and the stator. Since the stator is engaged to a substantial structure by spline 28, the input drive source becomes stalled.

This condition continues until the lockout torque is reduced. When this occurs, the plurality of springs 40, which have been compressed due to the lockout torque, expand forcing output cam 8 toward input cam 2 and the plurality of balls 7 into their detent sockets 6 and 13. Friction between the plurality of breaker and reaction plates 18 and 20 is reduced, and adjustment clearance 32 widens. When this happens, the input torque is then coupled to any output coupler, as has been described.

Accordingly, the foregoing disclosure and description thereof are for illustrative purposes only and do not in any way limit the invention which is defined only by the appended claims.

What is claimed is:

1. An apparatus for limiting the amount of torque from a drive source supplied to a torque responsive element, and for locking such drive source when the drive torque is in excess of a predetermined and adjustable maximum limit, which is adapted to operate in either of two directions of rotation and automatically resets when the excessive drive torque is removed, comprising:
    an input cam extending along the length of the apparatus, said cam including a flange with an input cam plate;
    an output cam including an output cam plate and a spline around the outside circumference of said cam, said cam adapted to slidably mount coaxially over a portion of said input cam;
    a stator rotatably secured to said input cam and encompassing said output cam and a portion of said input cam, said stator having a spline along its inside circumference, said stator being secured to a substantially rigid structure;
    means for sensing excessive torque from said drive source and for slidably displacing in an axial direction said output cam with respect to said input cam;
    means for axially locking said output cam to said input cam and to said stator and said rigid structure when a condition of excess torque has been reached and exceeded;
    means for unlocking said output cam to said stator and said rigid structure when excessive torque has been removed; and,
    means for adjusting the amount of input torque required to lock said output cam to said stator.

2. The apparatus of claim 1 wherein said means for sensing excessive torque comprises:
    said input cam with said input cam plate containing a plurality of ball detent sockets;
    said output cam with said output cam plate containing a plurality of ball detent sockets which are located within said cam plate such as to correspond in spacing and in shape to said detent sockets in said input cam plate; and,
    a plurality of balls adapted to fit within said detent sockets in said cam plates whereby said balls cooperate in the transmission of torque from said input cam to said output cam in an axially direction away from said input cam when relative motion occurs between said cams.

3. The apparatus of claim 1 wherein said means for locking said output cam to said stator comprises:
- a plurality of reaction plates slidably mounted coaxially around said output cam and engaging said spline on said stator;
- a plurality of brake plates slidably mounted coaxially around said output cam and engaging said spline on said output cam with said brake plates interleaved between said reaction plates and adapted to rotate freely with respect to said reaction plates when excessive torque has not been reached; and,
- adapted to contact and lock to said reaction plates when the output cam has been axially displaced away from said input cam, thereby locking said output cam to said stator.

4. The apparatus of claim 1 wherein said unlocking means comprises a plurality of springs slidably mounted coaxially around said input cam and abutting said output cam, said springs urging said output cam plate into said input cam plate.

5. The apparatus of claim 1 wherein said adjustment means comprises:
- an adjustment clearance which exists axially adjacent to said plurality of reaction and break plates such that when said output cam is displaced axially from said input cam, said plurality of plates are displaced axially into such clearance; and,
- an adjustment nut engaging a plurality of teeth on said input cam, said adjustment nut increasing or decreasing said clearance in proportion to the rotation of said nut.

* * * * *